Oct. 13, 1959 M. I. BURGETT, JR 2,908,749

MULTIPLE-SIGNAL MODULATION SYSTEM

Filed May 23, 1955 3 Sheets-Sheet 1

INVENTOR.
MONTE I. BURGETT, JR.
BY
Allen V. Hazeltine
ATTORNEY

INVENTOR.
MONTE I. BURGETT, JR.
BY
[signature]
ATTORNEY

INVENTOR.
MONTE I. BURGETT, JR.
BY
Owen V. Haskine
ATTORNEY

United States Patent Office
2,908,749
Patented Oct. 13, 1959

2,908,749

MULTIPLE-SIGNAL MODULATION SYSTEM

Monte I. Burgett, Jr., Philadelphia, Pa., assignor to Philco Corporation, Philadelphia, Pa., a corporation of Pennsylvania Application May 23, 1955, Serial No. 510,221
15 Claims. (Cl. 178—5.4)

This invention relates to improved apparatus for producing, in color television receivers, a composite signal whose amplitude is representative, at time-spaced intervals, of the respective intensities of a plurality of colors. More particularly, the invention resides in improved circuitry for deriving such a composite signal from a plurality of separate, simultaneously existing signals, each of which is representative of the intensity of one of said colors.

While my invention is useful in conjunction with a number of different forms of receivers, it provides the greatest improvement in performance in a system which utilizes a particular form of picture tube. Accordingly my invention will be described hereinafter with reference to that kind of tube.

The kind of picture tube to which I refer is characterized by having a beam-intercepting, image-forming screen structure which comprises laterally displaced stripe groups, each of which includes three parallel stripes constituted of luminescent materials and respectively responsive to electron impingement to produce light of three different colors. The longitudinal axes of each stripe group and of the stripes included therein are arranged parallel to the horizontal beam-scanning lines of the tube.

Conventional deflection apparatus is provided for deflecting the cathode-ray beam produced by the tube in horizontal and vertical directions and at such relative rates that, during successive horizontal line scans, the beam follows paths generally coincident with the center stripes of different ones of said groups of three stripes. In addition, auxiliary means are provided for cyclically deflecting the cathode ray beam in a vertical direction many times per line scanning interval and with a displacement amplitude such that all of the stripes within the group, along whose center stripe the beam is scanning, are traversed by the beam during each auxiliary deflection cycle. In such a system, the center stripe of the group is obviously impinged by the beam twice as often as either of the two bordering stripes; consequently information regarding the contemporaneous intensity of the color emitted by the center stripe must be supplied to the image tube twice as often as information regarding the intensities of the colors emitted by either of the bordering stripes.

When this form of image tube was first devised, it was attempted to produce the required composite color signal by deriving, from the pre-existing separate color signals, sharp pulses having amplitudes determined by the appropriate color signal and occurring in the proper sequence. Pulses representative of any one color must obviously recur at the rate of successive beam impingements upon phosphor stripes emissive of light of that same color; in a practical case, this may be 7 mc./sec. for the bordering stripes of each group and 14 mc./sec. for the center stripe. However, because the pulses are sharp, they contain numerous harmonic components of their basic recurrence rate. In fact it was found that components extending up to about 80 megacycles had to be produced, amplified and applied to the cathode ray tube in order to avoid undue distortion of the pulses. Because such wide-band systems are expensive they have proved to be impractical for use in commercial equipment. Moreover, the aforementioned harmonic components tended to be contaminated by other signals generated within the television system. Such contamination causes distortion of the colors reproduced by the image tube. Prior attempts to overcome these difficulties took the form of utilizing the three separate color signals to amplitude-modulate different carrier waves, each constituted of only a single component having a frequency equal to the repetition rates of the particular multi-component pulse-train which it replaces. These modulated carrier waves were additively combined and the resultant composite signal was supplied to the cathode ray tube. While the composite signal so produced was narrow-band and therefore economically attainable, it was also found that this signal often had an amplitude, during beam impingement upon any given phosphor stripe, which bore little relationship to the contemporaneous amplitude of the appropriate color signal, with the result that the colors reproduced by the image tube were disturbingly different from those present in the televised image. This difficulty arose from the fact, among others, that one of the modulated carrier waves had a frequency equal to twice the frequency of the other two modulated carrier waves. Because of this, the composite wave formed by their additive combination had, during any given interval of beam impingement upon one phosphor stripe, an amplitude proportional to the algebraic sum of all three separate color signals, rather than an amplitude proportional only to the amplitude of the appropriate one of these color signals.

Accordingly, it is an object of the invention to provide improved systems for processing the color signals supplied to a color television image reproducer.

Another object is to provide improved systems for processing three color signals, respectively indicative of different primary color components of a televised image, the modulator systems being effective to synthesize a composite signal in which the information indicative of one of said primary colors recurs at twice the rate at which the information indicative of each of the other two primary colors recurs.

A further object is to provide improved modulator systems for processing three color signals respectively indicative of different primary color components of a televised image, the modulator systems being effective to synthesize a composite signal whose components lie within a relatively narrow frequency range but whose amplitude is nonetheless accurately indicative, at predetermined time intervals, of the contemporaneous amplitude of only one of each different color signal.

An additional object is to provide improved modulator systems of the aforedescribed type which are simple to construct and which are inexpensive.

Further objects of the invention will appear as the specification progresses.

I have found that the economies of narrow-band operation can be achieved, without sacrificing the accuracy with which the composite signal represents intelligence concerning any given color during the critical time intervals, by producing carrier waves at only two frequencies, namely at the frequencies which are respectively equal to the two different rates of beam traversal of center stripes and of bordering stripes. To this extent systems embodying my invention resemble the aforedescribed prior art. However, I have found in addition that the inaccuracies which beset the prior art narrow-band systems can be eliminated if the apparatus used to modulate these carrier waves with the preexisting color representative signals produces modulated components at a frequency equal to the rate of beam traversal of the center stripes in response to each of the color representative signals (i.e. even in response to those signals which represent the colors of the bordering stripes) and if this apparatus further produces a unidirectional signal in response to each color representative signal.

More particularly, apparatus embodying my invention should be responsive to the signal representative of the center stripe color to produce a unidirectional component and a modulated carrier wave at a frequency equal to the rate of occurrence of intervals of beam impingement upon this center stripe. This apparatus should further be responsive to each of the signals which represent the bordering stripe colors to produce a unidirectional signal, a modulated carrier wave at a frequency equal to the rate of occurrence of beam impingement upon each bordering stripe and also a modulated carrier wave at a frequency equal to twice that rate of beam impingement upon bordering stripes.

It will be shown hereinafter that, if particular amplitude and phase relationships are established between all of these produced signals, their combination yields a composite signal which achieves all of the aforesaid objectives.

The invention will be described in greater detail with reference to the appended drawings forming part of the specification and in which.

Figure 1:
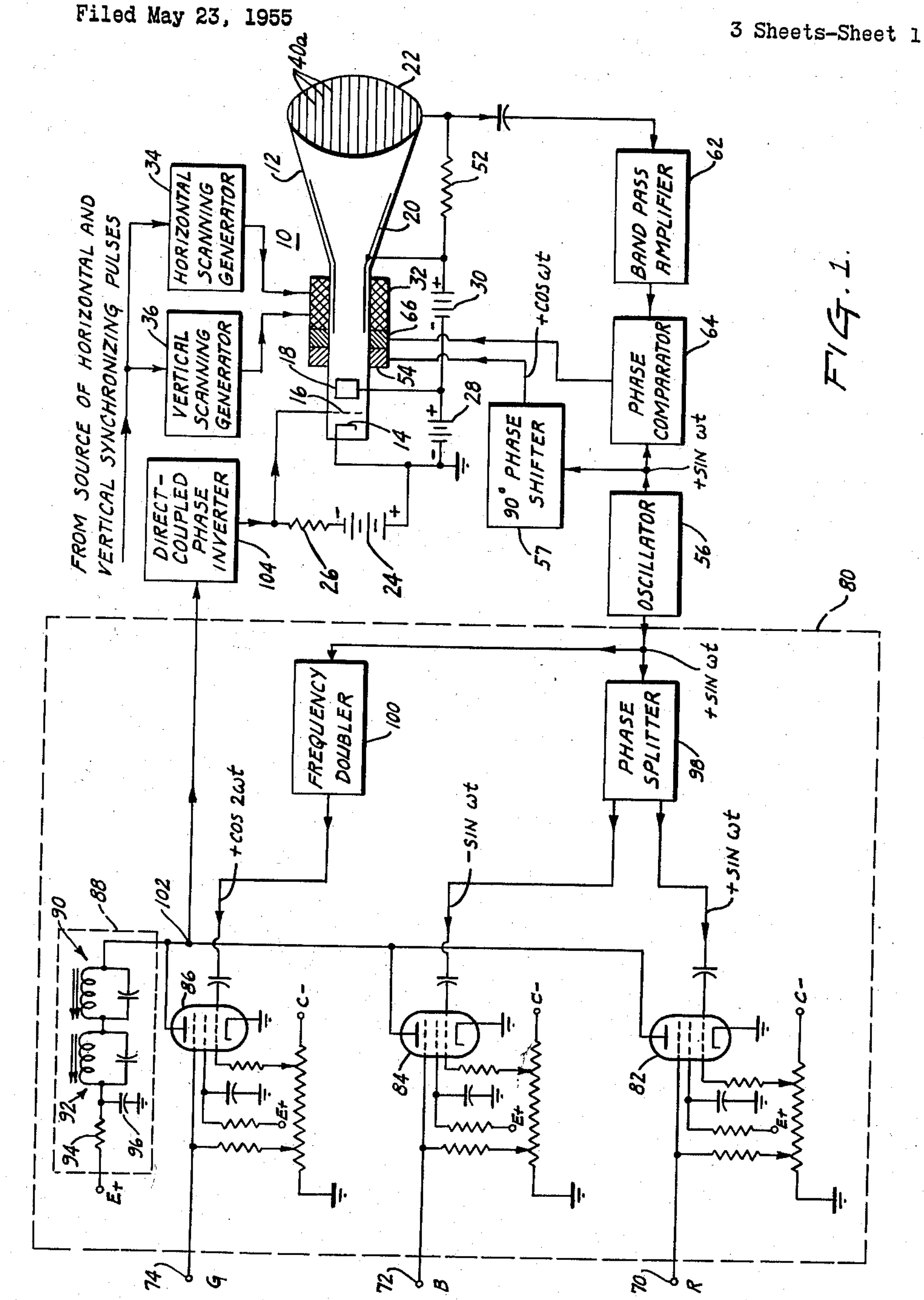
Figures 1 and 2 are diagrams, partly in block and partly in schematic form, illustrating respectively those portions of two color television reproducing systems which embody my invention.

Referring to Figure 1, the apparatus there shown comprises a cathode ray tube 10 containing, within an evacuated envelope 12, a conventional beam generating and intensity control system which includes a cathode 14, an intensity control electrode 16, a focusing electrode 18 and an accelerating electrode 20. Electrode 20 may consist of an electrically conductive coating applied to the inner wall of the envelope and terminating at a point spaced from the end face 22 of the tube 10 in conformity with well established practice. Electrode 16 is maintained at a desired bias potential by means of a battery 24 having its negative pole connected to the electrode through a resistor 26. Suitable voltage sources, shown as the batteries 28 and 30, maintain the electrodes 18 and 20 at their desired operating potentials. Specifically, the battery 28 has its negative terminal connected to a point at ground potential and its positive terminal connected to electrode 18, and the battery 30 has its negative pole connected to the positive pole of battery 28 and its positive pole connected to electrode 20.

A conventional deflection yoke 32, coupled to conventional horizontal and vertical scanning generators 34 and 36, is provided for deflecting the electron beam across the face plate 22 to trace the usual raster thereon.

Figure 3:
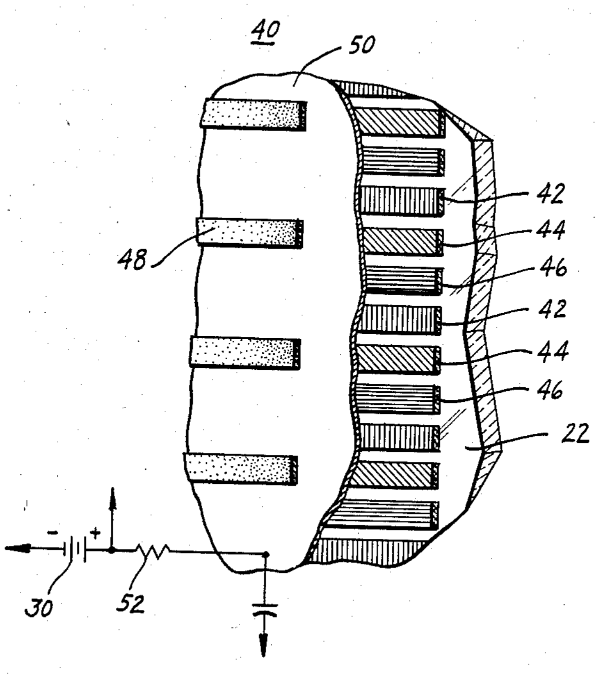
Figure 3 is a perspective fragmentary view of the screen structure of a cathode ray tube suitable for use in the color television reproducing systems shown in Figures 1 and 2.

The face plate 22 of tube 10 is provided with an image forming screen structure 40, one suitable form of which is illustrated in Figure 3 to which more particular reference may now be had. The structure 40 comprises a plurality of groups of parallel phosphor stripes 42, 44 and 46 of luminescent materials which are respectively responsive to electron impingement to emit light of the three different primary colors, e.g. red, green and blue. In one arrangement, each stripe 42 may consist of a phosphor, such as zinc phosphate containing manganese as an activator, which upon electron impingement emits red light; each stripe 44 may consist of a phosphor, such as zinc orthosilicate, which upon electron impingement emits green light; and each stripe 46 may consist of a phosphor, such as calcium magnesium silicate containing titanium as an activator, which upon electron impingement emits blue light. Other suitable materials which may be used to form the stripes 42, 44 and 46 are well known to those skilled in the art, as are the methods of applying the same to the face plate 22, and further details concerning the same are believed to be unnecessary.

The screen structure 40 is further equipped to produce a so-called indexing signal, i.e. a signal which is indicative of the point of impingement of the cathode ray beam on the screen structure. For this purpose, the structure 40 is provided with a plurality of stripes 48 composed of a material having a secondary electron emissivity detectably, different from the secondary electron emissivity of an electron-permeable aluminum layer 50 which is sandwiched between the phosphor stripes 42, 44 and 46 and the indexing stripes 48. The stripes 48 may consist of magnesium oxide, or of a high atomic number metal such as gold, platinum or tungsten.

Referring again to Figure 1, the screen structure of Figure 3 is symbolized therein by a plurality of horizontal lines 40*a*. This structure is connected to the positive pole of battery 30 through a load impedance 52 connected to the conductive coating 50 of the screen structure.

In addition to the conventional scanning generators 34 and 36 and the conventional deflection yoke 32, there is provided an auxiliary yoke 54 supplied from an oscillator 56, by way of a phase shifter 57, with an oscillatory deflecting signal. This auxiliary yoke is constructed so that, in response to the signal from oscillator 56, it deflects the beam recurrently in a direction transverse to the stripes so that, during each horizontal line scan, the beam impinges many times upon the adjacent red, green and blue phosphor stripes in succession. In the form most simply realized, this auxiliary transverse deflection of the beam is sinusoidal. In practice the oscillator 56 operates at a periodicity $\omega$, which may be $2\pi \times 7$ mc./sec., supplying its sinusoidally varying output voltage to the input of phase shifter 57. Phase shifter 57, in turn, produces an output voltage which leads the output voltage of oscillator 56 by substantially 90°. The output voltage of phase shifter 57 is then supplied to the auxiliary vertical deflection yoke 54, thereby to produce a periodic deflection of the cathode ray beam recurrent at a 7 mc./sec. rate in phase with the variations in output voltage of oscillator 56. The scanning pattern which is produced in this manner is shown in Figure 4, to which reference may now be had.

Figure 4:
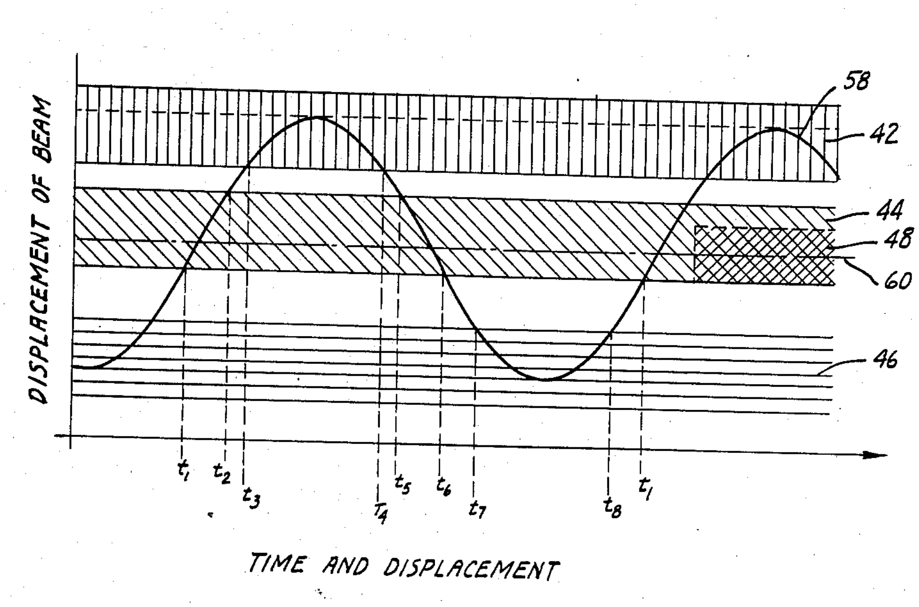
Figure 4 is a diagram illustrating one manner in which the cathode ray beam may be caused to scan the screen structure shown in Figure 3.

More particularly, in Figure 4 there is plotted the path described by the center of the cathode-ray beam over a small segment of one horizontal deflection, vertical displacement of the beam being plotted along the axis of ordinates and horizontal displacement being plotted along the axis of abscissas. Since, during each line scan, the beam progresses with substantially constant velocity in a horizontal direction, a given distance along the axis of abscissas also represents a certain time duration.

Superposed upon this plot of the beam scanning path is a diagrammatic representation of a segment of a group of three adjoining color phosphor stripes, located with respect to the rest of the beam scanning paths so as to depict a typical path which the beam center may follow with relation to these phosphor stripes. For convenience of identification, the portion of the diagram of Figure 4 which represents any given phosphor stripe has been designated by the same reference numeral as the corresponding phosphor stripe in Figure 3.

As shown in Figure 4, the beam traverses a sinusoidal path 58 symmetrical with respect to an axis 60 which is parallel to stripes 42, 44 and 46. The position of this axis with respect to the positions of the phosphor stripes, as well as the spacing of the phosphor stripes relative to one another, is preferably established in a manner such that, during each cycle of sinusoidal displacement of the beam, the beam dwells upon each of the stripes for a predetermined time interval. In particular, stripe 42, emissive of red light, is scanned for a time interval equal to $(t_4-t_3)$; stripe 44, emissive of green light, is scanned for a time interval equal to $(t_2-t_1)+(t_6-t_5)$ and stripe 46, emissive of blue light, is scanned for a time interval $(t_8-t_7)$. Moreover the indexing stripe 48, a portion of which is also indicated diagrammatically in Figure 4, is positioned symmetrically with respect to axis 60. It is to be understood that this indexing stripe extends the entire length of the phosphor stripe group.

The scanning of the beam across the indexing stripe 48 produces, across load impedance 52 in Figure 1, an indexing signal having variations indicative of departures, from axis 60, of the center point of the recurrent vertical deflection of the beam. This indexing signal may be used to control the average vertical position of the beam so that its auxiliary vertical movement is confined to a given group of phosphor stripes during each horizontal line scanning period, notwithstanding nonlinearities of the vertical deflection produced by the conventional vertical scanning generator 36, and notwithstanding irregularities in the stripe structure. More specifically, the impingement of the beam on the indexing stripe 48 twice during each cycle of the auxiliary transverse deflection of the beam (which deflection, it will be recalled, takes place at a 7 mc./sec. rate) produces across the load impedance 52 a series of pulses which recur at the rate of 14 million per second. When the auxiliary deflection of the beam is accurately centered on axis 60, and hence on the indexing stripe 48, these pulses will be equally spaced and no 7 mc./sec. component will be present therein. By contrast, in the event that the center of movement of the beam departs from axis 60, adjacent pairs of pulses will be brought closer together or spaced farther apart, with the result that a 7 mc./sec. component will be present in the signal generated across load impedance 52. This 7 mc./sec. signal, which may be selectively derived from the load impedance 52 by means of a bandpass amplifier 62 (see Figure 1), exhibits a phase determined by the direction of the departure of the beam from its desired path and has an amplitude determined by the extent of this departure.

The 7 mc./sec. signal so generated is supplied to one input of a phase comparator 64, to a second input of which is supplied a 7 mc./sec. signal from the oscillator 56. At the output of the phase comparator there is then produced a control signal having a polarity and intensity determined by the phase and amplitude of the 7 mc./sec. indexing signal derived from the amplifier 62. This control signal is supplied to an auxiliary deflection yoke 66 and serves to correct for departures of the beam from its desired path centered about the axis 60 of indexing stripe 48.

The oscillator 56 may be conventional in form and may, for example, comprise an electron discharge device having its input and output electrodes coupled together in regenerative feedback relationship by means of a resonant circuit tuned at 7 mc./sec. Preferably the frequency of oscillator 56 is crystal-controlled.

The phase shifter 57 may also have a conventional structure, and may consist, for example, of two parallel-resonant circuits, each tuned to 7 mc./sec, and inductively coupled to produce the desired 90° phase shift between the two circuits. Alternatively, phase shifter 57 may consist of a delay line constructed to produce a 270° lag in the phase of a 7 mc./sec. signal supplied thereto.

The bandpass amplifier 62 may also be conventional in form and may comprise, for example, one or more amplifying stages and a filter in the form of a resonant circuit which is broadly tuned to 7 mc./sec., and which selectively attenuates signals at harmonics of 7 mc./sec., e.g. at 14 mc./sec.

The phase comparator 64, which is also conventional, may consist of a bridge, two arms of which are made up of diode elements which are supplied in phase opposition with one of the input signals and which are supplied in phase coincidence with the other of the input signals. Such a form of phase comparator is described in detail by R. H. Dishington in "Proceedings of the I.R.E.", December 1949, at page 1401 et seq.

As has been pointed out, the cathode-ray tube requires that there be applied to its intensity control electrode 16 a wave whose intensity represents a given color during each interval that the cathode ray beam impinges upon a phosphor stripe emissive of that given color. To this end there are provided color signal input terminals 70, 72 and 74 which are supplied, from the conventional preceding stages of a television receiver (not shown), with separate color signals whose amplitudes are respectively indicative of the red, blue and green color content of the televised scene. It is then necessary to convert these three separate color signals into a single, composite signal in which portions representing different color information are arranged in the same time sequence as that in which the cathode ray beam scans the respective phosphor stripes. Since the centrally positioned phosphor stripe of each stripe group (in this instance the green phosphor stripe 44) is impinged by the beam twice during each of the auxiliary transverse deflection cycles, while the red and blue stripes 42 and 46 respectively are impinged only once during each of said cycles, signal portions representing green information must be present in the composite wave twice as often as signal portions representing either red or blue.

In accordance with my invention, the aforedescribed composite signal is generated within that portion of the embodiment of Figure 1 which is enclosed by a broken line 80. This portion of the system comprises three multi-grid vacuum tubes, respectively designated by reference numerals 82, 84 and 86, each of which may be a conventional pentode having a cathode, an anode, a first control grid electrode positioned adjacent the cathode, a second control grid electrode positioned adjacent the anode, and a screen grid electrode positioned between the first and second control grid electrodes. The cathodes of all three vacuum tubes are grounded, while their anodes are connected to a source of anode potential E+ by a common anode load impedance 88 which comprises the series combination of two parallel-resonant circuits 90 and 92 and a resistor 94. The latter resistor is by-passed to ground by a capacitor 96 for periodicities equal to or greater than the periodicity $\omega$ of the output wave generated by oscillator 56. The parameters of this common anode load impedance 88 are of importance in the successful practice of my invention and will be described in detail hereinafter. The second control grid electrode of each of vacuum tubes 82, 84 and 86 is connected to different ones of the separate color signal input terminals 70, 72 and 74. The first control grid electrode of each of these vacuum tubes is connected to an output terminal of oscillator 56. More particularly, the first control grid electrode of tube 82 is connected to oscillator 56 by way of a conventional phase splitter 98 in a manner such that the carrier wave applied to the first control grid electrode is in phase with the output signal from oscillator 56. The first control grid electrode of tube 84 is also connected to oscillator 56 by means of phase splitter 98, but in a manner such that the carrier wave applied to tube 84 is in phase opposition to the signal produced by the oscillator. Finally the first control grid electrode of tube 86 is connected to oscillator 56 by means of a conventional frequency doubler 100 which is connected in a conventional manner to provide, at the first control electrode of tube 86, a carrier wave having a periodicity equal to twice the periodicity of the oscillator output signal and having a phase such that, if the oscillator output signal is mathematically represented by the expression sin $\omega t$, then the carrier wave applied to tube 86 in response to this oscillator output signal will have the mathematical form of cos $2\omega t$. That is, alternate negative maxima of the carrier wave supplied to tube 86 coincide with successive negative maxima of the oscillator signal.

In addition to being supplied with carrier waves in the aforedescribed manner, each control grid electrode of each of the three vacuum tubes under consideration is further supplied with a negative bias potential, which is derived from a conventional source of negative potential C— by means of a movable contact of a potentiometer connected across this source of potential. In each case, the connection between the control grid electrode of the tube and the movable contact of the bias supplying potentiometer is made by menas of an isolating resistor. The screen grid electrode of each of the three vacuum tubes is supplied, in a conventional manner, with a suitable positive potential.

The connection 102 between the anodes of the three vacuum tubes and their common load impedance 88 constitutes the output terminal of this modulator system and is connected to the input of a direct-coupled phase inverter circuit 104, of any conventional form, whose output is connected in turn to the beam intensity control grid electrode 16 of cathode ray tube 10.

In operation, each of the tubes 82, 84 and 86 is operated under Class C conditions, i.e., the respective amplitudes of the negative bias potential and of the carrier wave applied to the first control grid electrode of each tube are such that cathode current flows within the tube for less than 180 electrical degrees, as measured at the carrier frequency. In preferred embodiments of the invention, each of tubes 82, 84 and 86 is one in which the screen grid electrode serves as an effective electrostatic shield between those portions of the tube comprising the cathode and the first control grid electrode, on the one hand, and the second control grid and the anode, on the other hand. In such a tube, the intensity of the cathode current depends substantially only upon the potentials applied to the first control grid electrode and to the screen grid electrode, and substantially not at all upon the potentials applied to the second control grid electrode and to the anode. Moreover, in such a tube, the second control grid electrode serves only to control the division of the cathode current between the screen grid electrode and the anode, in accordance with the potential applied thereto.

Therefore, in the present embodiment of the invention, wherein each of tubes 82, 84 and 86 is operated under Class C conditions, the pulses of cathode current, produced in response to the carrier wave applied to the first control grid electrode of the tube, have an intensity waveform which is substantially independent of the voltage applied to the second control grid electrode of the tube. For this reason those variations in the amplitude of a signal applied to this second control grid electrode, which occur at a rate appreciably lower than the frequency of the carrier wave supplied to the first control grid electrode, act only to vary the absolute intensity, but not the waveform, of that portion of the cathode current which is supplied to the anode of the tube. In this regard, the variations in the intensity of this anode current in response to variations in the amplitude of the signal applied to the second control grid electrode, i.e., the mutual transconductance of the tube between the anode and second control grid electrode, is adjustable to a desired value by the well-known expedient of establishing at an appropriate value the negative bias voltage supplied to the second control grid electrode.

The pulses of anode current which flow in each of tubes 82, 84 and 86, by reason of the Class C operation of these tubes, are constituted by the sum of an infinite number of Fourier current components. These components consist of a unidirectional component whose intensity equals the average intensity of these current pulses, and alternating components whose respective intensities relative to that of the unidirectional component depend upon the angle of conduction of the anode current, and whose respective frequencies are equal to the frequency of the carrier wave supplied to the first control grid electrode of the tube, and to integer multiples of this frequency. Moreover, the output voltage produced at the anode of the tube in response to any one of these components is equal to the product of the intensity of that component and the impedance presented by the anode load 88 to a current having the frequency of the latter component.

Accordingly, I have found that, by appropriately establishing the angle of anode current conduction of each of tubes 82, 84 and 86, as well as the values at specified frequencies of the impedance of anode load 88, I can derive, at the anode of each of the aforementioned tubes, an output signal having certain unidirectional and alternating components whose absolute amplitudes are proportional to the contemporaneous amplitude of the color signal supplied to the second control grid electrode of that tube and whose relative amplitudes are critically related in a manner such that, during the time intervals when the cathode ray beam of tube 10 is traversing that phosphor stripe of screen structure 40 which is emissive of the color represented by the color signal supplied to that tube, the output signal has an average value proportional to the contemporaneous amplitude of the color signal, while, during the times when the cathode ray beam is traversing phosphor stripes emissive of different colors, the output signal has an average amplitude equal to a reference value. More particularly, and as aforementioned, anode load impedance 88 consists of three series-connected circuits, namely the parallel-resonant circuit 90, tuned to resonate at the frequency $\omega/2\pi$ of the signal generated by oscillator 56, the parallel-resonant circuit 92, tuned to resonate at the frequency $\omega/\pi$, and the R-C circuit 94—96, which is effective to develop a unidirectional voltage whose value varies in proportion to the average value of the current passing through resistor 94. Thus, anode load 88 presents an appreciable impedance only to slowly-varying unidirectional currents and to alternating currents having periodicities of $\omega$ and of $2\omega$, and only corresponding components of the anode currents will be developed thereacross. These same components will then also be supplied to intensity control electrode 16 of cathode ray tube 10 by way of phase inverter 104.

Accordingly, in response to the carrier wave of form sin $\omega t$ which is supplied to the first control grid electrode of tube 82, and in response to the red color representative signal which is supplied from terminal 70 to the second control grid electrode, there is produced at the anode of tube 82 (and hence at junction 102) a voltage whose instantaneous value S to a good approximation, may be represented mathematically by the expression $$S=R(-a-b\sin\omega t+c\cos 2\omega t)$$

where

R is the amplitude of the red color signal, $a$ is the magnitude of the unidirectional voltage developed across impedance 88 in response to a red color signal of unit amplitude, $b$ is the amplitude of the alternating voltage of periodicity $\omega$ developed across impedance 88 in response to a red color signal of unit amplitude, and, $c$ is the amplitude of the alternating voltage of periodicity $2\omega$ developed across impedance 88 in response to a red color signal of unit amplitude.

For reasons already discussed, the relative values of $a$, $b$ and $c$ are dependent upon the angle of conduction of the anode current, as determined by the values of the negative bias voltage and of the amplitude of the carrier wave supplied to the first control electrode, and upon the respective impedance values, at D.-C., $\omega$ and $2\omega$, of load 88. The absolute values of $a$, $b$, and $c$ depend, in addition, on the value of the bias voltage applied to the second grid electrode of tube 82. These values of $a$, $b$ and $c$ are critical quantities according to my invention and may be ascertained by methods discussed hereinafter.

Because this output signal is applied to control electrode 16 by way of phase inverter 104, which may have a gain of substantially unity, the output signal generated by the tube 82, and supplied to control electrode 16, will have the form $$S_r=R[a+b\sin\omega t-c\cos 2\omega t]$$

Similarly, in response to the carrier wave of form ($-\sin\omega t$) which is supplied to the first control electrode of tube 84, and in response to the blue color signal which is supplied at terminal 72 to the second control grid electrode, there is produced, at intensity control electrode 16, a signal whose instantaneous value can, to a good approximation, be represented mathematically by the expression $$S_b=B(d-e\sin\omega t-f\cos 2\omega t)$$

where B is the amplitude of the blue color signal, and $d$, $e$ and $f$ are, respectively, the magnitudes of the unidirectional voltage, of the alternating voltages of frequency and of the alternating voltage of frequency $2\omega$ developed across load 88 in response to a blue color signal of unit amplitude.

In the case of tube 84, because the carrier wave supplied to the first control grid electrode of tube 86 has a periodicity $2\omega$, there is no component of anode current (and hence of output signal) which has a periodicity $\omega$. As a result, the output voltage developed across load 88 and supplied to control electrode 16 has the form $$S_g=G(h+k\cos 2\omega t)$$

where G is the amplitude of the green color signal, and $h$ and $k$ are respectively the magnitudes of the unidirectional voltage and of the alternating voltage of periodicity $2\omega$ which are developed across load 88 in response to a green color signal of unit amplitude.

I have found that, when the parameters $a$, $b$, $c$, $d$, $e$, $f$, $h$ and $k$ have the values set forth hereinafter, the output signal generated by any one of tubes 82, 84 and 86 has the form which I desire, namely an average value proportional to the amplitude of the color signal applied to that tube during the time interval during which the cathode-ray beam traverses a phosphor stripe emissive of the light of the same color, and an average amplitude substantially equal to a reference value, e.g. the cut-off anode voltage of the tube, during those time intervals during which the beam traverses phosphor stripes emissive of other colors. The aforementioned critical values can be expressed as follows:

$$a=\frac{c}{2\omega}\left\{\frac{\sin 2\omega t_2-\sin 2\omega t_1}{t_2-t_1}\right\}+\frac{b}{\omega}\left\{\frac{\cos\omega t_2-\cos\omega t_1}{t_2-t_1}\right\}$$

$$c=-2b$$

$$\left\{\frac{(\cos\omega t_8-\cos\omega t_7)(t_2-t_1)-(\cos\omega t_2-\cos\omega t_1)(t_8-t_7)}{(\sin 2\omega t_8-\sin 2\omega t_7)(t_2-t_1)-(\sin 2\omega t_2-\sin 2\omega t_1)(t_8-t_7)}\right\}$$

$$d=\frac{f}{2\omega}\left\{\frac{\sin 2\omega t_2-\sin 2\omega t_1}{t_2-t_1}\right\}-\frac{e}{\omega}\left\{\frac{\cos\omega t_2-\cos\omega t_1}{t_2-t_1}\right\}$$

$$f=2b$$

$$\left\{\frac{(\cos\omega t_2-\cos\omega t_1)(t_4-t_3)-(\cos\omega t_4-\cos\omega t_3)(t_2-t_1)}{(\sin 2\omega t_2-\sin 2\omega t_1)(t_4-t_3)-(\sin 2\omega t_4-\sin 2\omega t_3)(t_2-t_1)}\right\}$$

$$h=-\frac{c+f}{2\omega}\left\{\frac{\sin 2\omega t_4-\sin 2\omega t_3}{t_4-t_3}\right\}$$

$$k=c+f;\ e=b$$

Inspection of the foregoing relationships reveals that each of the parameters $a$, $c$, $d$, $e$, $f$, $g$, $h$ and $k$ is a function of the parameter $b$ and of the times $t_1$ to $t_8$ inclusive which, it will be recalled from the discussion of Figure 4, are the times at which the electron beam crosses the boundaries of the various phosphor stripes. As is apparent from Figure 4, these times are determined by the geometry of the screen structure, and by the specific form of the path 58 traversed by the cathode ray beam, and may be readily determined by those skilled in the art for any particular case.

From the foregoing it will be appreciated that, once the parameters $a$ through $k$ have been determined in accordance with the foregoing criteria, it becomes a simple matter to translate these values into actual adjustments of these bias potentials of tubes 82, 84 and 86, which determine their conduction angles. This is because there exists a well known relationship between these quantities, which is found, for example, in Fig. 7–31 of "Radio Engineering," by F. E. Terman, Third Edition, McGraw-Hill Book Company, New York, 1947, and in the discussion on pages 374 to 400 relating to that figure.

As shown in this publication, only a limited number of ratios between the intensities of the unidirectional, first and second harmonic components of the anode current are obtainable by varying the conduction angle. If the desired ratios between the intensities of these three components, as defined by the aforementioned parameters, are not among those obtainable by adjustment of the conduction angle, then an additional fine adjustment can be made by varying the values of the impedances of the circuits included in load 88. Moreover, by adjusting the bias supplied to the second control electrode of each tube, its gain may be established at that value for which the absolute amplitude of the components of the output signal generated thereby are proportional to the values of the parameters $a$ through $k$.

Figure 2:
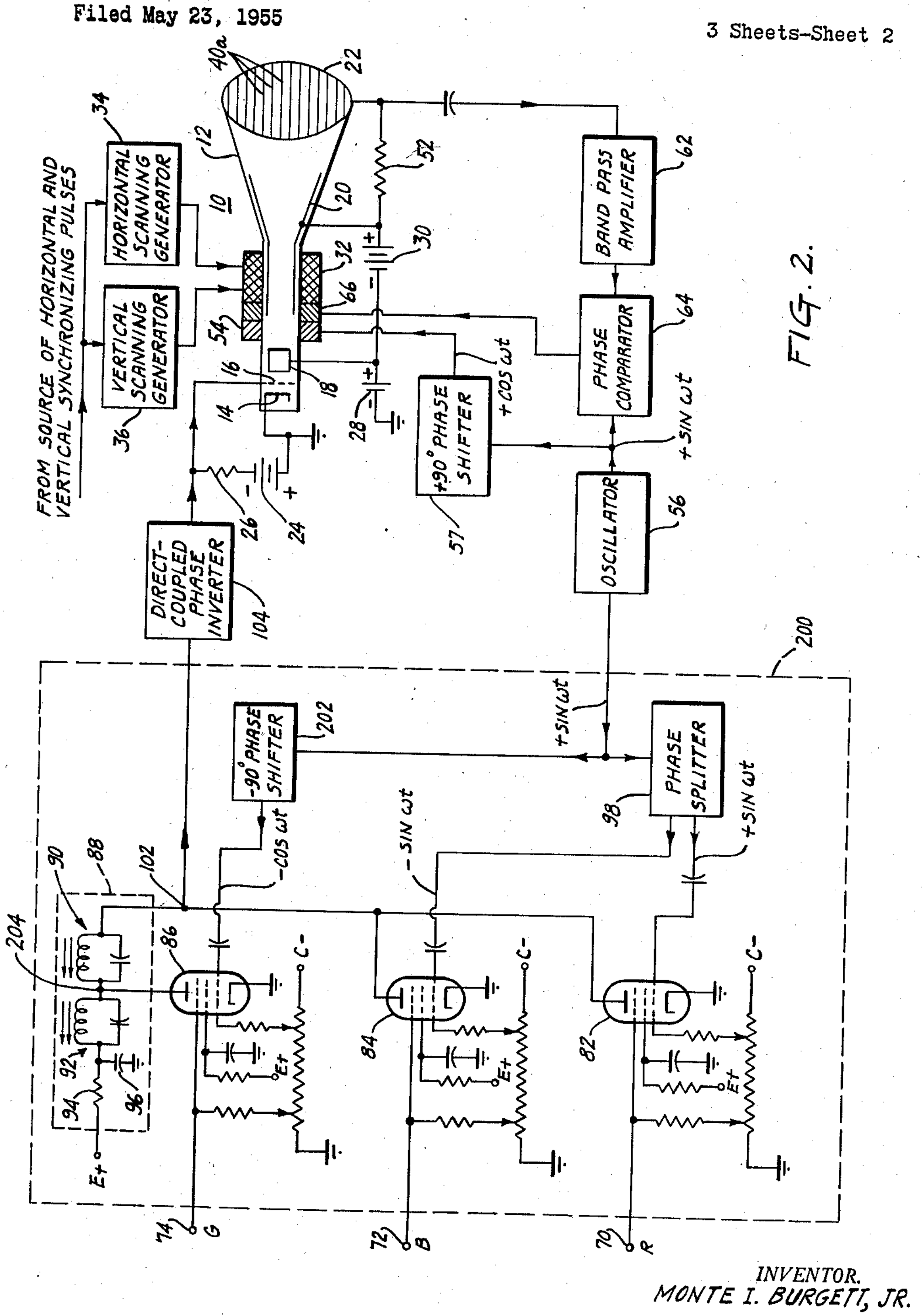

Figure 2 illustrates a second embodiment of the cathode ray tube system according to the invention. This embodiment comprises a modulator system 200 which differs in certain structural aspects from the modulator system 80 of Figure 1. Incidentally, those portions of the embodiment shown in Figure 2 which are identical to Figure 1 are designated by identical numerals.

More specifically, the modulator system 200 differs from the modulator system 80 shown in Figure 1 in that system 200 does not include the frequency doubler 100, but instead comprises a phase shifter 202 of conventional structure, the input of which is coupled to the output of oscillator 56, and the output of which is coupled to the first control grid electrode of modulator tube 86. Phase shifter 202 is constructed and arranged to produce an output signal whose phase lags that of the output signal of oscillator 56 supplied thereto by 90 electrical degrees, as measured at the frequency $\omega$.

In addition, the anode of tube 86 is connected to the junction 204 (which interconnects circuits 90 and 92 of load impedance 88), instead of being connected to junction 102.

The operation of those circuits which include respectively tubes 82 and 84 is substantially the same as in modulator system 80 of Figure 1, and for this reason these circuits are not discussed further herein. However, the circuit associated with tube 86 of modulator 200, and its mode of operation, are different from anything found in modulator 80. More specifically, the carrier wave supplied to the first control grid electrode of tube 86 has a periodicity $\omega$ (instead of a periodicity $2\omega$, as in Figure 1). As a result, tube 86 generates, in response to this carrier wave, current pulses which have a component of periodicity $\omega$ as well as a component of periodicity $2\omega$. However, anode 116 of tube 86 is now connected to junction 204 of circuits 90 and 92. Therefore its anode current flows through circuits 92 and 94, 96 which have negligible impedance to signals of periodicity $\omega$ and substantially no voltage of periodicity $\omega$ is developed at the anode of tube 86. By contrast, circuit 94, 96 has substantial impedance to unidirectional signals, and circuit 92 has substantial impedance to signals of periodicity $2\omega$. Therefore there does appear, at the anode of tube 86, a voltage having a unidirectional component and a component whose periodicity is $2\omega$. This voltage is supplied to junction 102 by way of circuit 90. The composite signal, formed by additively combining the anode voltages of tubes 82, 84 and 86, has substantially the same waveform as that formed by the correspondingly numbered tubes in modulator system 80 of Figure 1 and is supplied to intensity control electrode 16 of cathode ray tube 10, by way of direct-coupled phase inverter 104, just as in Figure 1.

Because, in the system of Figure 2, tube 86 is excited by a carrier wave of periodicity $\omega$ and not by a carrier wave of periodicity $2\omega$ as in Figure 1, a different conduction angle will be required for this tube in order to cause it to produce a unidirectional component and a component of periodicity $2\omega$ in the ratios desired in accordance with my invention. However, it is well within the skill of a worker in the art to readjust appropriately the bias voltages as well as the amplitude of the supplied carrier wave.

While the preceding discussion has related specifically to two embodiments of the invention described in connection with the specific image screen structure 40 shown in Figures 3 and 4, it will be understood that my invention is not limited to use in conjunction with a screen structure having that specific geometry. More particularly, it will be apparent from a consideration of the foregoing discussion that the invention is broadly applicable to any receiver which uses a cathode-ray tube whose screen is formed of stripe groups arranged in the manner illustrated, regardless of which of the different colored light emissive stripes forms the center stripe of each group.

Moreover, the invention is also applicable to screen structures in which the stripe groups are disposed with their longitudinal axes transverse to the horizontal line scanning direction. In such an arrangement no auxiliary vertical beam deflection is required, but instead each stripe group is constituted of four parallel phosphor stripes disposed with a stripe emissive of light of one color between each two stripes emissive of light of the other two colors.

In addition, modulator systems different from those shown in Figures 1 and 2 may also be used. For example, the desired proportioning of the amplitudes of the carrier wave components of periodicity $\omega$ and of periodicity $2\omega$ may be accomplished prior to the application of the unmodulated carrier waves to the modulator tubes (rather than by adjustment of the tube parameters as hereinbefore described). This reduces the complexity of adjustment of the tube parameters but requires the inclusion of additional amplitude control apparatus in the carrier wave supply paths.

Moreover, while in both of those embodiments of my invention which are illustrated respectively in Figures 1 and 2 of the drawing, the composite signal is supplied to intensity control electrode 16 of cathode ray tube 10 by way of a direct-coupled phase inverter 104, thereby to supply the unidirectional components of the composite signal as well as its alternating components, it will be well understood that the composite signal may alternatively be supplied by way of an A.-C. phase inverter and a D.-C. restorer circuit connected in that order between junction 102 and control electrode 16.

While I have described my invention with reference to certain specific embodiments, I do not wish to be limited thereto, for obvious modifications will occur to those skilled in the art without departing from the scope of my invention.

What I claim is:

1. In combination: means for producing a first output signal consisting substantially only of a component of predetermined periodicity, a component of twice said periodicity and a unidirectional component, said means being responsive to a first intelligence signal to vary the amplitude of each of said components in accordance with variations in said intelligence signal; means for producing a second output signal consisting substantially only of a component of twice said predetermined periodicity and a unidirectional component, said means being responsive to a second intelligence signal to vary the amplitude of each of said last-named components in accordance with variations in said second intelligence signal, and means for additively combining said first and second output signals.

2. A combination according to claim 1, wherein said means for producing said first output signal comprises a first electron discharge tube having a cathode, an anode and first and second control electrodes, means for supplying to said first control electrode a first carrier wave having said periodicity, means for supplying said first intelligence signal to said second control electrode, and means for supplying to said first control electrode a bias potential having a value such that the anode current of said tube flows only during a predetermined portion of each cycle of said carrier wave; and wherein said means for producing said second output signal comprises a second electron discharge tube having a cathode, an anode and first and second control electrodes, means for supplying to said first control electrode of said second tube a second carrier wave having twice said periodicity, means for supplying said second intelligence signal to said second control electrode of said second tube, and means for supplying to said first control electrode of said second tube a bias potential having a value such that the anode current of said second tube flows only during a predetermined portion of each cycle of said second carrier wave.

3. A combination according to claim 1, wherein said means for producing said first output signal comprises a first electron discharge tube having a cathode, an anode, and first and second control electrodes, means for supplying to said first control electrode a first carrier wave having said periodicity and a given phase, means for supplying said first intelligence signal to said second control electrode, and means for supplying to said first control electrode a bias potential having a value such that the anode current of said tube flows only during a predetermined portion of each cycle of said carrier wave; and wherein said means for producing said second output signal comprises a second electron discharge tube having a cathode, an anode, and first and second control electrodes, means for supplying to said first control electrode of said second tube a second carrier wave having said periodicity and a phase differing from said given phase, means for supplying said second intelligence signal to said second control electrode of said second tube, and means for supplying to said first control electrode of said second tube a bias potential having a value such that the anode current of said second tube flows only during a predetermined portion of each cycle of said second carrier wave.

4. In combination: a source of first and second signals respectively representative of intelligence; means for producing first and second carrier waves having a given periodicity and differing in phase; means supplied with said first intelligence signal and said first carrier wave, said means being responsive to said first carrier wave to produce a first output signal consisting substantially only of a unidirectional component, a component of said periodicity and a component of twice said periodicity, said means being responsive in addition to said first intelligence signal to vary the amplitude of each of said components of said first output signal in accordance with variations in said first intelligence signal; means supplied with said second intelligence signal and said second carrier wave, said last-named means being responsive to said second carrier wave to produce a second output signal consisting substantially only of a unidirectional component and a component of twice said periodicity, said last-named means being responsive in addition to said second intelligence signal to vary the amplitude of each of said components of said second output signal in accordance with variations in said second intelligence signal; and means for additively combining said first and second output signals.

5. In combination: a source of first and second signals respectively representative of intelligence; means for producing a first carrier wave having a given periodicity and a second carrier wave having twice said periodicity; means supplied with said first intelligence signal and said first carrier wave, said means being responsive to said first carrier wave to produce a first output signal consisting substantially only of a unidirectional component, a component of said periodicity and a component of twice said periodicity, said means being responsive in addition to said first intelligence signal to vary the amplitude of each of said components of said first output signal in accordance with variations in said first intelligence signal; means supplied with said second intelligence signal and said second carrier wave, said last-named means being responsive to said second carrier wave to produce a second output signal consisting substantially only of a unidirectional component and a component of twice said periodicity, said last-named means being responsive in addition to said second intelligence signal to vary the amplitude of each of said components of said second output signal in accordance with variations in said second intelligence signal; and means for additively combining said first and second output signals.

6. In combination: means for producing an output signal consisting substantially only of a unidirectional component having a given polarity, an alternating component having a given periodicity and an alternating component of twice said given periodicity having a phase such that its alternate maxima of said given polarity coincide with those successive maxima of said first-named alternating component which have said given polarity, said means being responsive to a first signal representative of intelligence to vary the absolute amplitude of each of said components of said output signal in accordance with variations in said intelligence signal, the relative amplitudes of said components produced by said means and varied thereby in response to variations in said intelligence signal being such that, during each time interval of a first plurality of successive time intervals which occur with said periodicity, said output signal has an average value substantially proportional to the contemporaneous amplitude of said intelligence signal, and, during each time interval of a second plurality of successive time intervals which occur with said periodicity, said output signal has an average value substantially equal to a predetermined reference value; means for producing an output signal consisting substantially only of a unidirectional component having said given polarity and an alternating component of twice said periodicity having a phase such that its alternate maxima of said given polarity occur during said successive time intervals of said second plurality, said last-named means being responsive to a second signal representative of intelligence to vary the absolute amplitude of each of said components of said latter output signal in accordance with variations in said second intelligence signal, the relative amplitude of said components produced by said means and varied thereby in response to said variations in said second intelligence signal being such that, during each time interval of said second plurality, said last-named output signal has an average value substantially proportional to the contemporaneous amplitude of said second intelligence signal, and during each time interval of said first plurality, said last-named output signal has an average value substantially equal to said predetermined reference value; and means for additively combining said output signals.

7. In combination: a source of first and second signals respectively representative of intelligence; means for producing a first carrier wave having a given periodicity and a second carrier wave having twice said periodicity; a first electron discharge tube having a cathode, an anode, and first and second control electrodes; means for supplying said first carrier wave to said first control electrode; means for supplying, to said first control electrode, a bias potential having a value such that the anode current of said tube flows only during a predetermined portion of each cycle of said first carrier wave; means for supplying said first intelligence signal to said second control electrode; and means for deriving from said anode an output signal consisting substantially only of a unidirectional component having a given polarity, an alternating component of said periodicity and an alternating component of twice said periodicity having a phase such that its alternate maxima of said given polarity coincide with those successive maxima of said first-named alternating component which have said given polarity, the relative amplitudes of said components being such that, during each time interval of a first plurality of successive time intervals which occur with said periodicity, said output signal has an average value substantially proportional to the contemporaneous amplitude of said first intelligence signal, and, during each time interval of a second plurality of successive time intervals which occur with said periodicity, said output signal has an average value substantially equal to a predetermined reference value; a second electron discharge tube having a cathode, an anode, and first and second control electrodes; means for supplying said second carrier wave to said first control electrode of said second tube; means for supplying, to said last-named electrode, a bias potential having a value such that the anode current of said second tube flows only during a predetermined portion of each cycle of said second carrier wave; means for supplying said second intelligence signal to said second control electrode of said second tube, and means for deriving, from said last-named anode, an output signal consisting substantially only of a unidirectional signal having said given polarity and an alternating signal of twice said periodicity having a phase such that its alternate maxima of said given polarity occur during successive time intervals of said second plurality, the relative amplitudes of said last-named components being such that, during each time interval of said second plurality, said last-named output signal has an average value proportional to the contemporaneous amplitude of said second intelligence signal, and, during each time interval of said first plurality, said last-named output signal has an average value substantially equal to said predetermined reference value; and means for additively combining said output signals.

8. In combination: a source of first and second signals respectively representative of intelligence; means for producing first and second carrier waves having a given periodicity and differing in phase; a first electron discharge tube having a cathode, an anode, and first and second control electrodes; means for supplying said first carrier wave to said first control electrode; means for supplying, to said first control electrode, a bias potential having a value such that the anode current of said tube flows only during a predetermined portion of each cycle of said first carrier wave; means for supplying said first intelligence signal to said second control electrode; and means for deriving from said anode an output signal consisting substantially only of a unidirectional component having a given polarity, an alternating component of said periodicity and an alternating signal of twice said periodicity having a phase such that its alternate maxima of said given polarity coincide with those successive maxima of said first-named alternating component which have said given polarity, the relative amplitudes of said components being such that, during each time interval of a first plurality of successive time intervals which occur with said periodicity, said output signal has an average value proportional to the contemporaneous amplitude of said first intelligence signal, and, during each time interval of a second plurality of successive time intervals which occur with said periodicity, said output signal has an average value substantially equal to a predetermined reference value; a second electron discharge tube having a cathode, an anode, and first and second control electrodes; means for supplying said second carrier wave to said first control electrode of said second tube; means for supplying, to said last-named electrode, a bias potential having a value such that the anode current of said tube flows only during a predetermined portion of each cycle of said second carrier wave; means for supplying said second intelligence signal to said second control electrode of said second tube; and means for deriving, from said last-named anode, an output signal consisting substantially only of a unidirectional component having said given polarity and an alternating component of twice said periodicity having a phase such that its alternate maxima of said given polarity occur during successive time intervals of said second plurality, the relative amplitudes of said last-named two components being such that, during each time interval of said second plurality, said last-named output signal has an average value proportional to the contemporaneous amplitude of said second intelligence signal, and, during each time interval of said first plurality, said last-named output signal has an average value substantially equal to said predetermined reference value; and means for additively combining said output signals.

9. In combination: a cathode-ray tube comprising a fluorescent screen structure and means for producing a cathode-ray beam, said structure comprising a plurality of parallelly disposed phosphor stripes arranged in groups, each stripe of a group being emissive of light of a different color in response to impingement by said beam; means for deflecting said beam parallel to said stripes successively within each of said groups; means for further deflecting said beam cyclically across the stripes of each of said groups at a periodicity such that said beam traverses the stripes of each group a plurality of times during a traversal of said group by said beam; first and second means supplied respectively with first and second signals respectively representative of intelligence regarding different ones of said colors, and additionally supplied respectively with first and second carrier waves having said periodicity and having predetermined different phases, each of said first and second means being responsive to said supplied carrier wave to produce an output signal consisting substantially only of a unidirectional component, an alternating component of said periodicity and an alternating component of twice said periodicity, each of said first and second means being responsive in addition to said supplied intelligence wave to vary the amplitude of each of said components in accordance with variations in the intelligence signal supplied to said means; third means supplied with a third signal representative of intelligence regarding a third of said colors, and with a third carrier wave having twice said periodicity, said third means being responsive to said third carrier wave to produce an output signal consisting substantially only of a unidirectional component and an alternating component of twice said periodicity, said third means being responsive in addition to said third intelligence signal to vary the amplitude of each of said components of said last-named output signal in accordance with variations in said third intelligence signal; and means supplied with said output signals and responsive thereto to control the intensity of said cathode-ray beam.

10. In combination: a cathode-ray tube comprising a fluorescent screen structure and means for producing a cathode-ray beam, said structure comprising a plurality of parallelly disposed phosphor stripes arranged in groups, each stripe of a group being emissive of light of a different color in response to impingement by said beam; means for deflecting said beam parallel to said stripes successively within each of said groups; means for further deflecting said beam cyclically across the stripes of each of said groups at a periodicity such that said beam traverses the stripes of each group a plurality of time during a traversal of said group by said beam; first, second and third means supplied respectively with first, second and third signals respectively representative of intelligence regarding different ones of said colors, and additionally supplied respectively with first, second and third carrier waves having said periodicity and having predetermined different phases, each of said first and second means being responsive to said supplied carrier wave to produce an output signal consisting substantially only of a unidirectional component, an alternating component of said periodicity and an alternating component of twice said periodicity, each of said first and second means being responsive in addition to said intelligence signal supplied to said means to vary the amplitude of each of said components in accordance with variations in said last-named intelligence signal, and said third means being responsive to said carrier wave supplied thereto to produce an output signal consisting substantially only of a unidirectional component and an alternating component of twice said periodicity, said third means being responsive in addition to said third intelligence signal supplied thereto to vary the amplitude of each of said last-named components in accordance with variations in said third intelligence signal; and means supplied with said output signals and responsive thereto to control the intensity of said cathode-ray beam.

11. In combination: a cathode-ray tube comprising a screen structure and means for producing a cathode-ray beam, said structure having first, second and third portions respectively responsive to beam impingement to emit light of different colors; means for deflecting said beam to cause it to impinge successively upon said first, second, third and second portions; a source of first, second and third signals respectively representative of intelligence regarding different ones of said colors; first and second means for producing respectively first and second output signals, each consisting substantially only of a unidirectional component of given polarity, an alternating component having a given periodicity and an alternating component of twice said periodicity having a phase such that its alternate maxima of said given polarity coincide with those successive maxima of said first-named alternating component which have said given polarity, the phases of said components of said periodicity of said first and second output signals being such that their respective successive maxima of said given polarity occur during those intervals when said beam impinges upon said first and third portions respectively, said first means being supplied with said first color signal and being responsive thereto to vary the absolute amplitude of each of said components of said first output signal in accordance with variations in said first color signal, the relative amplitudes of said components produced by said first means and varied thereby in response to said variations in said first color signal being such that, during each time interval when said beam impinges upon said first portion, said first output signal has an average value proportional to the contemporaneous amplitude of said first color signal, and, during each time interval when said beam impinges upon other portions, said output signal has an average value substantially equal to a predetermined reference value, said second means being supplied with said second color signal and being responsive thereto to vary the absolute amplitude of each of said components of said second output signal in accordance with variations in said second color signal, the relative amplitude of said components produced by said second means and varied thereby in response to said variations in said second color signal being such that, during each time interval when said beam impinges upon said second portion, said second output signal has an average value proportional to the contemporaneous amplitude of said second color signal, and, during each time interval when said beam impinges upon other portions, said second output signal has an average value substantially equal to said predetermined reference value; and third means for producing a third output signal consisting substantially only of a unidirectional component having said given polarity and an alternating component of twice said periodicity having a phase such that its maxima of said given polarity occur during the time intervals when said beam impinges upon said third portion, said third means being supplied with said third color signal and being responsive thereto to vary the absolute amplitude of each of said last-named components in accordance with variations in said third color signal, the relative amplitudes of said components produced by said third means and varied thereby in response to said variations in said third color signal being such that, during each time interval when said beam impinges upon said third portion, said third output signal has an average value proportional to the contemporaneous amplitude of said third color signal and during each time interval when said beam impinges other portions, said third output signal has an average value substantially equal to a predetermined reference value; and means supplied with said three output signals and responsive thereto to control the intensity of said cathode-ray beam.

12. In combination: a cathode-ray tube comprising a fluorescent screen structure and means for producing a cathode-ray beam, said structure comprising a plurality of spaced, parallel stripe groups, each of said stripe groups including a center stripe and two bordering stripes respectively flanking said center stripe on either side, different ones of said stripes being responsive to beam impingement to emit light of different colors; means for deflecting said beam parallel to said stripes successively within each of said groups; means for further deflecting said beam sinusoidally across the stripes of each of said groups at a periodicity such that said beam traverses the stripes of each group a plurality of times during a traversal of said group by said beam, said beam impinging during successive time intervals upon one of said bordering stripes, upon said center stripe, upon the other of said bordering stripes, and again upon said center stripe; a source of first, second and third signals respectively representative of intelligence regarding different ones of said colors; means for producing two sinusoidal carrier waves of said periodicity, the first of which is substantially in phase with said sinusoidal deflection and the second of which is substantially in phase opposition with said sinusoidal deflection; means for producing a third cosinusoidal carrier wave of twice said periodicity; first and second means supplied respectively with said first and second color signals, and additionally supplied respectively with said first and second carrier waves, each of said first and second means being responsive to said supplied carrier wave to produce respectively first and second output signals, each consisting substantially only of a unidirectional component having a given polarity, an alternating component of said periodicity and an alternating component of twice said periodicity having a phase such that its alternate maxima of said given polarity coincide with those successive maxima of said first-named alternating component which have said given polarity, said first means being responsive in addition to said first color signal supplied thereto to vary the absolute amplitude of each of said components of said first output signal in accordance with variations in said first color signal, the relative amplitudes of said components produced by said first means and varied thereby in response to said variations in said first color signal being such that, during each time interval when said beam impinges upon said one bordering stripe, said first output signal has an average value proportional to the contemporaneous amplitude of said first color signal, and during each time interval when said beam impinges upon other stripes, said first output signal has an average value substantially equal to a predetermined reference value, said second means being responsive in addition to said second color signal supplied thereto to vary the absolute amplitude of each of said components of said second output signal in accordance with variations in said second color signal, the relative amplitudes of said three components produced by said second means and varied in accordance with said variations in said second color signal being such that, during each time interval when said beam impinges upon said other bordering stripe, said second output signal has an average value proportional to the contemporaneous amplitude of said second color signal, and, during each time interval when said beam impinges upon other stripes, said second output signal has an average value substantially equal to said predetermined reference value; and third means supplied with said third color signal and said third carrier wave, said third means being responsive to said third carrier wave to produce a third output signal consisting substantially only of a unidirectional component having said given polarity and an alternating component of twice said periodicity having a phase such that its maxima of said given polarity occur during each time interval when said beam impinges upon said center stripe, said third means being responsive in addition to said third color signal to vary the absolute amplitude of each of said last-named components in accordance with variations in said third color signal, the relative amplitudes of said components produced by said third means and varied thereby in response to said variations in said third color signal being such that, during each time interval when said beam impinges upon said center stripe, said third output signal has an average value proportional to the contemporaneous amplitude of said third color signal, and, during each time interval when said beam impinges upon other stripes, said third output signal has an average value substantially equal to said predetermined reference value; and means supplied with said first, second and third output signals and responsive thereto to control the intensity of said cathode-ray beam.

13. In combination: a cathode-ray tube comprising a fluorescent screen structure and means for producing a cathode-ray beam, said structure comprising a plurality of spaced, parallel stripe groups, each of said stripe groups including a center stripe and two bordering stripes respectively flanking said center stripe on either side, different ones of said stripes being responsive to beam impingement to emit light of different colors; means for deflecting said beam parallel to said stripes successively within each of said groups; means for further deflecting said beam sinusoidally across the stripes of each of said groups at a periodicity such that said beam traverses the stripes of each group a plurality of times during a traversal of said group by said beam, said beam impinging during successive time intervals upon one of said bordering stripes, upon said center stripe, upon the other of said bordering stripes and again upon said center stripe; a source of first, second and third signals respectively representative of intelligence regarding different ones of said colors; means for producing three sinusoidal carrier waves of said periodicity, the first of which is substantially in phase with said sinusoidal deflection, the second of which is substantially out of phase with said sinusoidal deflection, and third of which lags said sinusoidal deflection by substantially 90°; first and second means supplied respectively with said first and second color signals, and additionally supplied respectively with said first and second carrier waves, each of said first and second means being responsive to said supplied carrier wave to produce respectively first and second output signals, each consisting substantially only of a unidirectional component having a given polarity, an alternating component of said periodicity and an alternating component of twice said periodicity having a phase such that its alternate maxima of said given polarity coincide with those successive maxima of said first-named alternating component which have said given polarity, said first means being responsive in addition to said first color signal supplied thereto to vary the absolute amplitude of each of said components of said first output signal in accordance with variations in said first color signal, the relative amplitudes of said components produced by said first means and varied in response to said variations in said first color signal being such that, during each time interval when said beam impinges upon said one bordering stripe, said first output signal has an average value proportional to the contemporaneous amplitude of said first color signal, and during each time interval when said beam impinges upon other stripes, said first output signal has an average value substantially equal to a predetermined reference value, said second means being responsive in addition to said second color signal supplied thereto to vary the absolute amplitude of each of said components of said second output signal in accordance with variations in said second color signal, the relative amplitudes of said three components produced by said second means and varied thereby in response to said variations in said second color signal being such that, during each time interval when said beam impinges upon said other bordering stripe, said second output signal has an average value proportional to the contemporaneous amplitude of said second color signal, and, during each time interval when said beam impinges upon other stripes, said second output signal has an average value substantially equal to said predetermined reference value; and third means supplied with said third color signal and said third carrier wave, said third means being responsive to said third carrier wave supplied thereto to produce a third output signal consisting substantially only of a unidirectional component having said given polarity and an alternating component of twice said periodicity having a phase such that its maxima of said given polarity occur during each time interval when said beam impinges upon said center stripe, said third means being responsive in addition to said third color signal supplied thereto to vary the absolute amplitude of each of said last-named components in accordance with variations in said third color signal, the relative amplitudes of said components produced by said third means and varied thereby in response to said variations in said third color signal being such that, during each time interval when said beam impinges upon said center stripe, said third output signal has an average value proportional to the contemporaneous amplitude of said third color signal, and, during each time interval when said beam impinges upon other stripes, said third output signal has an average value substantially equal to said predetermined reference value; and means supplied with said first, second and third output signals and responsive thereto to control the intensity of said cathode-ray beam.

14. In combination: a source of first and second signals respectively representative of intelligence; means for producing a sinusoidal carrier wave having a given periodicity and a cosinusoidal carrier wave having twice said periodicity; first and second electron discharge tubes, each having a cathode, an anode, and first and second control electrodes; means respectively connecting said cathodes of said first and second tubes to a point at reference potential; a source of a potential positive with respect to said reference potential; a load directly connecting said source to said anodes of said first and second tubes, said load consisting of the series-connected combination of a resistor-capacitor circuit, a first parallel-resonant circuit turned to said periodicity, and a second parallel-resonant circuit tuned to twice said periodicity, said resistor-capacitor circuit consisting of a resistor,, a capacitor having a reactance at said periodicity small with respect to the resistance of said resistor, and means connecting said capacitor effectively in shunt with said resistor with respect to alternating currents supplied to said resistor-capacitor circuit; means for supplying said sinusoidal and cosinusoidal carrier waves to said first control electrodes of said first and second tubes respectively; means for supplying said first and second intelligence signals to said second control electrodes of said first and second tubes respectively; said first tube producing, in response to successive positive-going half-cycles of said sinusoidal carrier wave applied to its first control electrode, successive pulses of anode current flowing through said common anode load, said load developing thereacross in response to said successive current pulses flowing therethrough a first output signal consisting substantially only of a unidirectional component, an alternating component of said periodicity and an alternating component of twice said periodicity, said three components having relative amplitudes dependent on the duration of each of said successive current pulses, said duration having a critical value for which said three components have relative amplitudes such that, during each time interval of a first plurality of successive time intervals which occur with said periodicity, said first output signal has an average value proportional to the contemporaneous amplitude of said first intelligence signal, and during each time interval of a second plurality of successive time intervals which occur with said periodicity, said first output signal has an average value substantially equal to a predetermined reference value, said first tube being responsive to the magnitude of a bias potential applied to its first control electrode to control said duration of each of said current pulses, and means for supplying to said first control electrode of said first tube a bias potential having a magnitude such that each of said current pulses has a duration substantially equal to said critical value; said second tube producing, in response to successive positive-going half-cycles of said cosinusoidal carrier wave applied to its first control electrode, successive pulses of anode current flowing through said common anode load, said load developing thereacross in response to said last-named successive current pulses flowing therethrough a second output signal consisting substantially only of a unidirectional component and an alternating component of twice said periodicity, said last-named components having relative amplitudes dependent on the duration of each of said last-named successive current pulses, said last-named duration having a critical value for which said last-named components have relative amplitudes such that, during each time interval of said second plurality, said second output signal has an average value proportional to the contemporaneous amplitude of said second intelligence signal, and during each time interval of said first plurality, said last-named output signal has an average value substantially equal to said predetermined reference value, said second tube being responsive to the magnitude of a biasing potential applied to its first control electrode to control said duration of each of said last-named current pulses, and means for supplying to said first control electrode of said second tube a bias potential having a magnitude such that each of said last-named current pulses has a duration substantially equal to said last-named critical value.

15. In combination: a source of first and second signals respectively representative of intelligence; means for producing first and second sinusoidal carrier waves having a given periodicity and differing in phase by substantially ninety degrees; first and second electron discharge tubes, each having a cathode, an anode, and first and second control electrodes; means respectively connecting said cathodes of said first and second tubes to a point at reference potential; a source of a potential positive with respect to said reference potential; a load directly connecting said source to said anode of said first tube, said load consisting of the series-connected combination of a resistor-capacitor circuit and a first parallel-resonant circuit tuned to twice said periodicity, said resistor-capacitor circuit consisting of a resistor a capacitor having a reactance at said periodicity small with respect to the resistance of said resistor, and means connecting said capacitor effectively in shunt with said resistor with respect to alternating currents supplied to said resistor-capacitor circuit; a second parallel-resonant circuit tuned to said periodicity and interconnecting said anodes of said first and second tubes; an output terminal connected to said anode of said second tube; means for supplying said first and second carrier waves to said first control electrodes of said first and second tubes respectively; means for supplying said first and second intelligence signals to said second control electrodes of said first and second tubes respectively; said first tube producing, in response to successive positive-going half-cycles of said first carrier wave applied to its first control electrode, successive pulses of anode current flowing through said load, said load developing thereacross in response to said successive current pulses flowing therethrough a first output signal consisting substantially only of a unidirectional component and an alternating component of twice said periodicity, and said second parallel-resonant circuit transmitting said first output signal to said output terminal, said components of said first output signal having relative amplitudes dependent on the duration of each of said successive current pulses, said duration having a critical value for which said two components have relative amplitudes such that, during each time interval of a first plurality of successive time intervals which occur with said periodicity, said first output signal has an average value proportional to the contemporaneous amplitude of said first intelligence signal, and during each time interval of a second plurality of successive time intervals which occur with said periodicity, said output signal has an average value substantially equal to a predetermined reference value, said first tube being responsive to the magnitude of a biasing potential applied to its first control electrode to control said duration of each of said current pulses, and means for supplying to said first control electrode of said first tube a bias potential having a magnitude such that each of said current pulses has a duration substantially equal to said critical value; said second tube producing, in response to successive positive-going half-cycles of said second carrier wave applied to its first control electrode, successive pulses of anode current flowing through said load and second parallel-resonant circuit; said load and second parallel-resonant circuit developing thereacross and at said output terminal in response to said last-named current pulses a second output signal consisting substantially only of a unidirectional component, an alternating component of said periodicity and an alternating component of twice said periodicity, said last-named components having relative amplitudes dependent on the duration of each of said last-named current pulses, said duration having a critical value for which said last-named components have relative amplitudes such that, during each time interval of said second plurality, said second output signal has an average value proportional to the contemporaneous amplitude of said intelligence signal, and during each time interval of said first plurality, said second output signal has an average value substantially equal to said predetermined reference value, said second tube being responsive to the magnitude of a biasing potential applied to its first control electrode to control said duration of each of said last-named current pulses, and means for supplying to said first control electrode of said second tube a bias potential having a magnitude such that each of said last-named current pulses has a duration substantially equal to said last-named critical value.

References Cited in the file of this patent

UNITED STATES PATENTS

| | | |
|---|---|---|
| 2,671,129 | Moore | Mar. 2, 1954 |
| 2,676,200 | Sziklai | Apr. 20, 1954 |
| 2,691,743 | Urtel | Oct. 12, 1954 |
| 2,705,257 | Lawrence | Mar. 29, 1955 |
| 2,734,940 | Loughlin | Feb. 14, 1956 |
| 2,752,420 | Ehrich | June 26, 1956 |
| 2,773,118 | Moore | Dec. 4, 1956 |